Oct. 8, 1968  E. W. KIELSMEIER ET AL  3,404,430
METHOD AND APPARATUS FOR MAKING SAUSAGE PRODUCTS
Filed July 20, 1966  2 Sheets-Sheet 1
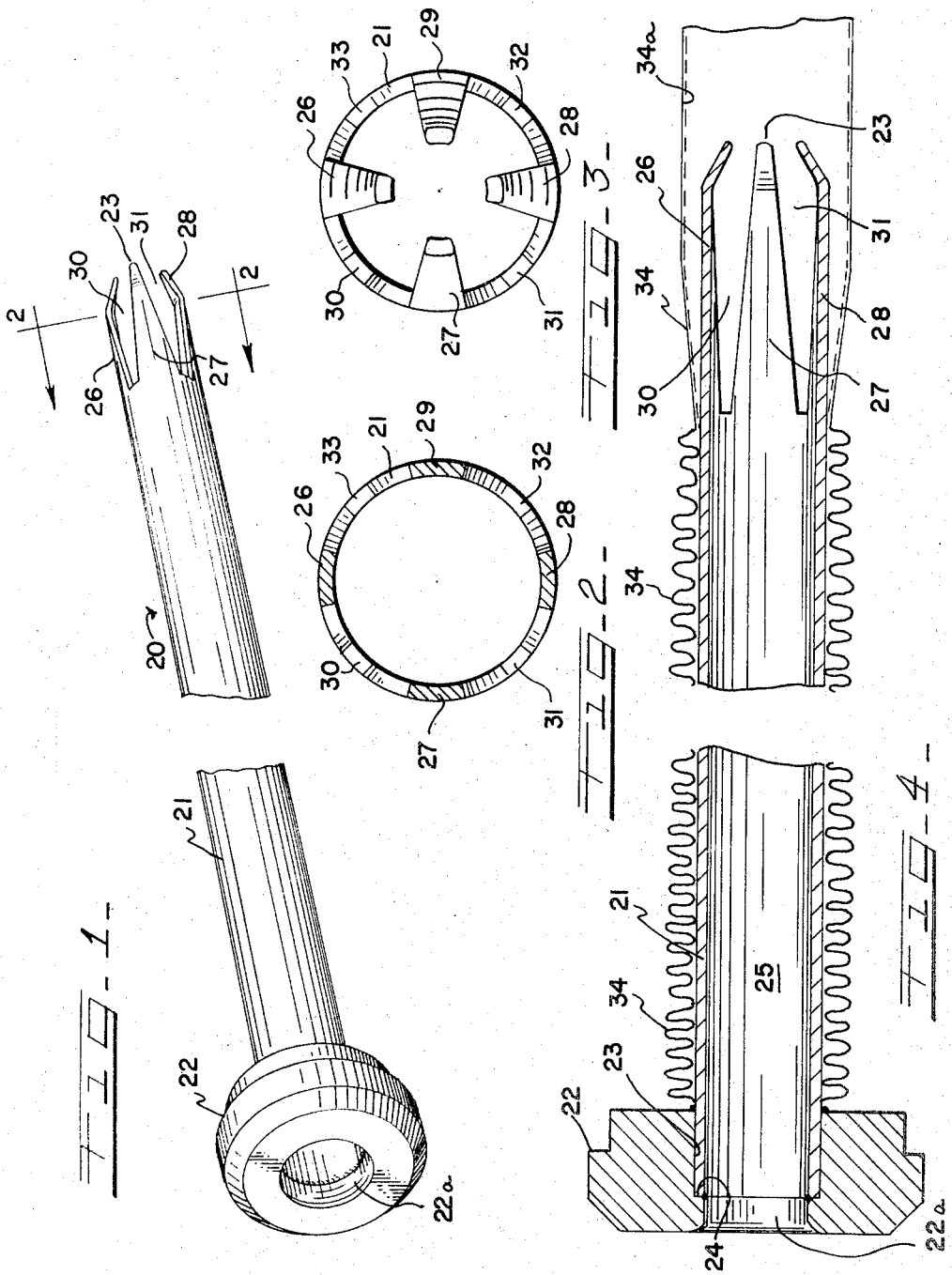
INVENTORS
ELWOOD W. KIELSMEIRER, FELIX E. KASBAUM
WILLIAM D. PAYNTER, JAMES E. ANDERSON
BY
ATT'YS.

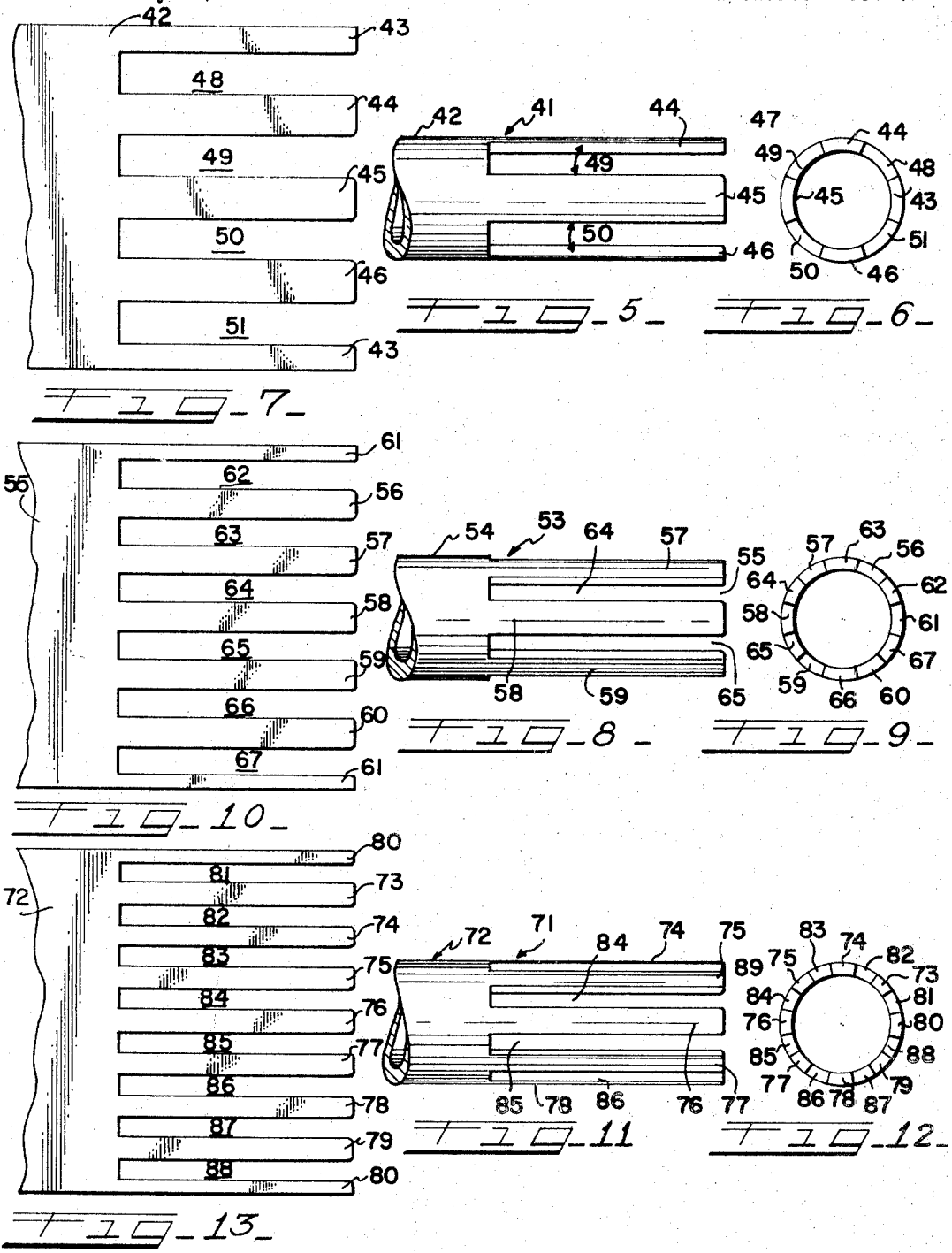

United States Patent Office 3,404,430
Patented Oct. 8, 1968

3,404,430
METHOD AND APPARATUS FOR MAKING SAUSAGE PRODUCTS
Elwood W. Kielsmeier, Felix E. Kasbaum, William D. Paynter, and James E. Anderson, Madison, Wis., assignors to Oscar Mayer & Co., Inc., Chicago, Ill., a corporation of Illinois
Filed July 20, 1966, Ser. No. 566,561
16 Claims. (Cl. 17—45)

ABSTRACT OF THE DISCLOSURE

A method and apparatus for extruding ground sausage batter having coarse and fine particles (i.e., a sausage batter characterized by a viscous fluid-like consistency which is used in smokie links, summer sausage and similar sausage products) into a product confining mold or casing in a manner wherein a desirable coarse surface particle appearance is provided. In particular, the ground sausage batter having coarse and fine surface particles is extruded through a tubular extrusion nozzle which is provided with a plurality of radially disposed spaced apart open ended slots which slots are sized to enable the passage of coarse particles of ground sausage batter therethrough, preferably these spaced apart openings or slots will have a circumferential width of from 0.25 to 1.0 radian.

---

The present invention relates to improvements and innovations in method and apparatus for the extrusion of sausage products. More particularly, this invention is directed to a unique method and apparatus for the control of surface particle appearance in sausage products formed from coarsely ground sausage batter such as, for example, that which is used in stuffing smokie links and like sausage products.

Traditionally, smokie links and like sausage products have had a characteristic coarse surface particle appearance. Such products have been generally made by extrusion of the coarsely ground sausage batter through conventional stuffing horns into natural or synthetic casings followed by linking and smoking operations. This coarse surface particle definition was brought about by the presence of the larger or coarser lean and fat sausage constituent particles adjacent the product surface.

In adapting modern food processing techniques to the manufacture of sausage products formed from coarsely ground sausage batter, it was found that excessive fat smearing and fine particle concentration adjacent the product surface was encountered resulting in a homogeneous surface appearance, considered undesirable insofar as consumer-purchase preference is concerned. In particular, it was noted that when smokie link sausages are processed on continuous sausage making equipment comparable to the type used for continuous frankfurter production, that the above mentioned undesirable homogeneous surface particle appearance resulted. As such, these smokie link sausages had a wiener-like appearance.

Efforts to overcome this problem and improve surface appearance in these sausage products initially involved the use of new and different methods of chopping, mixing and grinding. None of these techniques, however, provided a satisfactory solution to the problem. It was then decided that modifications to the stuffing method and/or apparatus might be useful in imparting the desired coarse surface particle appearance to the sausages. It was in connection with the applicants' experimentation in this area that the present invention was made.

In particular, it was discovered that an improved surface appearance (i.e. one having a greater concentration of coarse particles adjacent the product surface) can be obtained through the use of a stuffing horn having a notched tip portion, the notches or openings of which are sized to provide an auxiliary discharge outlet for the larger or coarser sausage batter particles. In accordance with the present invention it was found that the use of the notched horn tip allows the coarse particles of the ground sausage batter to migrate to the surface of the casing into which the batter is being stuffed and eliminates the homogeneous or smeared surface appearance that commonly results when the same sausage batter is stuffed through a conventional unnotched stuffing horn.

It was also discovered that the size of the notches is directly related to the degree of coarse particle definition obtained on the product surface. For example, when the transverse width of the notch is increased, the degree of coarse particle definition also increases. Similarly, when notch spacing or width is decreased, the degree of coarse surface particle definition is likewise reduced (i.e. there is a greater concentration of fines on the product surface).

It is, therefore, an important object of the present invention to provide an improved method and apparatus for making sausage products of increased coarse surface particle definition from ground sausage batter of the type generally used in stuffing smokie links and like sausage products.

Another important object of the present invention is to provide an improved method and apparatus for the extrusion of coarsely ground sausage batter into a casing or product mold which method and apparatus are adapted to prevent migration of the fine particle constituent of the coarsely ground sausage batter to the product surface.

Another important object of the present invention is to provide an improved method and apparatus for the making of sausage products from a coarsely ground sausage batter which method and apparatus involve extrusion of said coarsely ground sausage batter through a novel stuffing horn having a unique notched end portion adapted for selective deposition of the larger or coarser sausage particle constituents adjacent the product surface to provide an improved surface particle appearance in the thus formed sausage product.

Another important object of the present invention is to provide an improved method and apparatus for the stuffing of sausage products formed from coarsely ground sausage batter (i.e. smokie link sausage batter) which method and apparatus are particularly suitable for use in connection with continuous sausage making equipment comparable to the type used in continuous frankfurter production, to provide sausage products having a desirable coarse surface appearance.

Other and further objects of the present invention will be apparent from he following detailed description of the present invention taken in conjunction with the following drawings wherein:

FIGURE 1 is a fragmentary perspective of a stuffing horn assembly embodying principles of the present invention for the control of surface particle appearance in sausage products stuffed with coarsely ground sausage batter;

FIGURE 2 is a transverse section of the assembly as viewed generally along the line 2—2;

FIGURE 3 is an outer end view of the assembly shown in FIGURE 1;

FIGURE 4 is a longitudinal sectional view of the assembly shown in FIGURE 1 on which a casing has been applied;

FIGURE 5 is a fragmentary elevational view of a second embodiment of stuffing horn tip of the present invention;

FIGURE 6 is an outer end view of the stuffing horn tip shown in FIGURE 5;

FIGURE 7 is a developed view of the stuffing horn tip shown in FIGURE 5 illustrating the surface thereof as it appears when laid out in a single plane;

FIGURE 8 is a fragmentary elevational view of a third embodiment of the stuffing horn tip of the present invention;

FIGURE 9 is an outer end view of the stuffing horn tip shown in FIGURE 8;

FIGURE 10 is a developed view of the stuffing horn tip shown in FIGURE 8 illustrating the surface thereof as it appears when laid out in a single plane;

FIGURE 11 is a fragmentary elevational view of a fourth embodiment of the stuffing horn tip of the present invention;

FIGURE 12 is an outer end view of the stuffing horn tip shown in FIGURE 11; and

FIGURE 13 is a developed view of the stuffing horn tip shown in FIGURE 11 illustrating the surface thereof as it appears when laid out in a single plane.

The present invention is particularly concerned with the extrusion of ground sausage batter of the type commonly used in forming smokie links, summer sausage and like susage products. This sausage batter is characterized by a thick or viscous fluid-like consistency and is composed of ground meat to which spices, preservatives and controlled amounts of water are added. Accordingly, the terms "ground sausage batter" and "coarsely ground sausage batter" as used in the specification and claims are distinguishable from other extruded sausage materials such as wiener emulsions and malleable solids, such as, for example, pork sausage. Typical ground sausage batters of the type referred to in this application are prepared by grinding beef, pork and/or veal through a 3/16 inch plate and to which a controlled amount of water is added at least equal to that which is lost through the product processing (i.e. smoking), together with selected amounts of spices and preservatives.

It is important to note that the stuffing of sausages with ground sausage batters presents problems which are different from those encountered in stuffing operations involving wiener emulsions or pork sausage. For example, with wiener emulsions there are no separate or distinct fat and lean particles and it is considered to be particularly desirable that the product have a homogeneous surface appearance. As was noted above, such a homogeneous surface appearance is considered to be undesirable with smokie links and other sausage products formed from ground sausage batter. On the other hand, pork sausage, while composed of distinct fat and lean particles, does not behave like smokie link batter during stuffing operations since pork sausage resembles a malleable solid more than it does a batter or viscous fluid. Accordingly, prior art teachings relating to stuffing of wieners and/or pork sausage have generally been of little, if any, help to those skilled in this art in overcoming the unique problems encountered in the stuffing of smokie links and the like with ground sausage batter.

Referring to the drawings and particularly to FIGURES 1–4, a stuffing horn assembly 20 is shown embodying principles of the present invention for the stuffing of sausage products with ground sausage batter in a manner which imparts an improved coarse surface particle definition on the product. This assembly includes a tube 21, commonly referred to as a stuffing horn, which is adapted for connection at its flanged end 22 to a supply of ground sausage batter for delivery therethrough under pressure by suitable pumping equipment or the like. The internal diameter of tube 21 is less than the ultimate diameter of the stuffed product, the ground sausage batter being forced under compression through the tube 21 and expanding or enlarging out of the discharge end 23 of the tube.

As is best shown in FIGURE 4, tube 21 is snugly received within a centrally disposed recess 23 in flanged end 22 and bottoms against a shoulder 24 which, in the illustrated embodiment, is sized in accordance with the thickness of tube 21 so as to provide a smooth and continuous internal bore surface 25 with the inlet 22(a) of flanged end 22. Tube 21 can be fixed to flanged end 22 by welding or other suitable securement technique.

In accordance with the present invention, discharge end 23 has a notched construction consisting of a plurality of tapered batter confining nozzle extensions or fingers 26–29 which respectively define open areas or notches 30–33. As is shown, batter confining fingers 26–29 are preferably bowed or inclined slightly inwardly to facilitate the insertion of a conventional casing 34 thereover in preparing the assembly 20 for operative use. The casing 34 is mounted in bunched relation around the outer surface of tube 21 and extends along the surface adjacent batter confining fingers 26–29 to be engaged by ground sausage batter as it is discharged through notches or openings 26–29 and discharge end 23. Thus, a continuous casing stuffed with ground sausage batter is formed followed by linking of the stuffed casing in any suitable manner to form individual linked products. The connective links can then be cooked or smoked and the casing stripped therefrom followed by packaging of the individual links.

In accordance with the present invention, ground sausage batter is fed into inlet 22(a) of flanged end 22 from a suitable supply source and pumped through tube 21 under pressure for discharge into a natural or synthetic casing 34. At the discharge end 23 of tube 21 the open areas or notches 30–33 act as auxiliary discharge outlets and enable the coarser or larger particles of sausage batter to migrate to the inner surface 34a of casing 34 prior to discharge of the remainder of the ground sausage batter through discharge end 23. The result of this two stage sausage batter discharge stuffing technique is that the surface of the thus formed sausage product is predominantly characterized by the presence of the larger or coarser particles of the ground sausage batter. This advantageous result is obtained even when the smokie links or similar sausage products are made on automated equipment comparable to the type used for continuous production of frankfurters.

While the applicants do not wish to be bound to a precise scientific explanation for the phenomenon which occurs, it has been observed that in stuffing with un-notched conventional horns, a small amount of batter collects behind the discharge end of the horn on the inside of the casing. This batter undergoes a rolling action that causes selective deposition of the finer particles or "fines" at the stuffed product surface. In stuffing horns constructed in accordance with the present invention the notches or openings appear to destroy the result of this action by allowing the larger or coarser particles to come to the inner surface of the casing.

A second embodiment of the stuffing horn of the present invention is illustrated in FIGURES 5–7. As is shown, stuffing horn tip 41 includes a tubular body 42 and a set of four batter confining fingers 43–46 which define four coarse particle discharge notches 48–51, respectively, adjacent to the discharge end of the horn tip 47.

In the illustrated embodiment each of the batter confining fingers is continuous with tubular body 42 and extends a distance equal to approximately two times the internal diameter of tubular body 42. For example, in a stuffing horn tip having a half inch internal diameter, the batter confining fingers 43–46 could advantageously be about one inch in length. It is important, however, to note that variations in the length of the batter confining fingers can be made without significantly affecting the surface particle appearance of the finished product.

As is best shown in FIGURE 7, each of the batter confining 43–46 and notches 48–51 in the illustrated embodiment is of equal width. While such sizing is not essential to the present invention, it has been found that the stuffing horn tips constructed with equally sized and spaced batter confining fingers and notches provide advantageous results insofar as coarse surface appearance of the finished product is concerned. In particular, in a stuffing horn tip having a one-half inch internal diameter, used for extruding smokie link sausage batter ground through a 3/16 inch plate, having a 0.05 inch wall thickness with each of the batter confining fingers and notches being approximately 0.18 inch in width produced smokie link sausages having an excellent coarse surface appearance at both relatively low and high stuffing speeds. In this stuffing horn the open spaces or notches accounted for approximately 50% of the circumferential width with each of the notch widths being approximately 0.7 radian.

FIGURES 8–10 illustrate a six-point or six-notch stuffing horn tip 53. As is shown, this embodiment of the present invention generally includes a tubular body portion 54 of annular cross section which terminates adjacent the discharge end 55 with six axially extending batter confining fingers 56–61. Between said batter confining fingers are six equally spaced openings or notches 62–67 through which the coarser or larger particles of ground sausage batter migrate to the casing surface in accordance with the principles of the present invention.

As is best shown in FIGURE 10, each of the batter confining fingers 56–61 and notches 62–67 is of equal width. A stuffing horn of the type shown in FIGURES 8–10 having a one-half inch internal diameter stuffing horn with a wall thickness of approximately 0.05 inch would have each of the notches approximately 0.12 inch in width (0.47 radian).

FIGURES 11–13 illustrate a fourth embodiment of the present invention, viz. an eight-point or eight-notch stuffing horn tip 71 having a tubular body 72 which terminates in eight batter confining fingers 73–80. These batter confining fingers respectively define eight equally sized notches or openings 81–88.

In this illustrated fourth embodiment, each of the notches 81–88 is approximately 0.36 radian in width. Accordingly, in a stuffing horn having a half inch internal diameter and a 0.05 inch wall thickness, each of the equally spaced and sized product discharge notches 81–88 would be approximately 0.09 inch in width.

In each of the above-described embodiments of the present invention the notches and batter confining fingers are equally sized. It is important, however, to note that the practice of the present invention does not necessitate equal sizing of these stuffing horn tip components. In other words, if desired, the batter confining fingers can be larger than the coarse particle discharge notches or vice versa. By the same token it is not essential to the practice of this invention that each of the notches in a given stuffing horn be of the same width. While in the preferred embodiment of the present invention the notches are each of equal size, the only requirement on their size is that they be sufficiently wide for the coarse particles in the ground sausage batter to pass therethrough so as to enable these coarse particles to migrate to the inner surface of the product mold or casing into which the batter is being stuffed.

Experimental tests conducted with stuffing horn tips of the type described above have been performed in order to evaluate the effect of notch width on the finished product. In this regard, it was found that as the spacing between the batter confining fingers increased, the degree of coarse surface particle definition correspondingly increased. In other words, in sausage products stuffed with stuffing horn tips having wider spaces between the batter confining fingers, there was a greater concentration of the larger or coarser particles adjacent the stuffed product surface. The following experiments illustrate the advantageous results obtainable with the notches type of stuffing horn tips of the present invention.

*Experiment 1*

In this test, the smokie link batter, vacuum ground through a 3/16 inch plate, was stuffed into a #24 Visking casing by means of a hydraulic piston stuffer operated at a stuffing speed of 12 pounds per minute. In the initial test, a 1/2 inch outer diameter stuffing horn having four notches cut into the tip, each of which were 1/8 inch wide and 1/2 inch long was used. The product obtained with this tip was then compared with a control product, formed from the identical ground sausage batter, stuffed at the same speed on the same hydraulic piston stuffer, through a conventional unnotched stuffing horn of the same outer diameter.

The product stuffed on the notched stuffing horn exhibited a significantly greater degree of coarse surface particle definition adjacent the product surface than the product stuffed with the conventional unnotched stuffing horn.

*Experiment 2*

This experiment was conducted using the same ground sausage batter and hydraulic piston stuffer as that used in Experiment 1. Four different stuffing horns were empolyed. Each of these stuffing horns had a 1/2 inch outer diameter, with three of the test stuffing horns having four, six and eight notches, respectively, cut into the tip. The fourth stuffing horn was of the conventional unnotched variety.

The products were then stuffed on the hydraulic piston stuffer at a speed of 12 pounds per minute. In comparing the results obtained from this test it was found that the degree of surface particle definition increased with the increased width in the stuffing horn tips. In other words, the four-notched stuffing horn tip produced the greatest amount of surface particle definition while the stuffing horn tips with six and eight notches, respectively, exhibited lesser degrees of surface particle definition. The product stuffed with the conventional stuffing horn had a generally homogeneous fat smeared surface particle appearance.

*Experiment 3*

This experiment was conducted to compare smokie link sausages stuffed on a pneumatic piston stuffer with products stuffed on a hydraulic piston stuffer using stuffing horn tips with various tip configurations. In each case, the ground sausage batter was identical with that used in Experiment 1. With hydraulic piston stuffers, unnotched stuffing horn tips and those with six and twelve notches were used. In tests conducted with pneumatic piston stuffers unnotched horn tips and those having four, six, eight and twelve notches were used. All of the products were stuffed at a speed of four and one-half pounds per minute.

As was true in Experiment 2, it was noted that the greatest amount of surface particle definition occurred in the four-notched stuffing horn tip and that the degree of surface particle definition was reduced as the number of notches increased or, stated otherwise, as the notch width decreased, it was noted that the degree of surface particle definition was comparably reduced. It was particularly noted that with the notched horn tips the degree of coarse particle definition on the products was not affected by the type of stuffer (i.e. hydraulic or pneumatic) used.

*Experiment 4*

This experiment was conducted using a conventional unnotched stuffing horn as well as a four-notched stuffing horn in conjunction with a hydraulic piston stuffer and a pneumatic piston stuffer. The ground sausage batter was the same as that used in Experiment 1 as well as the casing. In this test, stuffing speeds were varied. In particular, stuffing speeds of four and one-half pounds per minute, 50 pounds per minute, and 100 pounds per minute were tested on the hydraulic piston stuffer.

The following table sets forth the degree of surface particle definition obtained in each of the tests of Experiment 4.

| Stuffing Device | Stuffing Horn | Stuffing Speed (lbs./min.) | Rating* |
|---|---|---|---|
| PPS | 4 notches | 4½ | 1 |
| HPS | do | 4½ | 2 |
| HPS | do | 50 | 3 |
| HPS | do | 100 | 4 |
| PPS | Reg. Horn | 4½ | 5 |
| HPS | do | 4½ | 6 |

PPS=Pneumatic piston stuffer.
HPS=Hydraulic piston stuffer.
*1=Coarsest surface particle definition, decreasing in intensity to No. 6

From the foregoing, it will be noted that the advantageous results of the present invention are obtained on both hydraulic and pneumatic piston stuffers and that the type of stuffer itself does not materially affect the degree of surface particle definition. Similarly, as was brought about, the four-notched stuffing horn, representing the preferred embodiment of the present invention, permits very high stuffing speeds in the order of 100 pounds per minute to produce sausage products having a better surface particle definition than those produced at significantly lower speeds, namely four and one-half pounds per minute, on regular unnotched stuffing horns of the same diameter regardless of whether the stuffing horns were operated in conjunction with a pneumatic or hydraulic piston stuffer.

It will be apparent that modifications and variations of the present invention may be made from the specific embodiments set forth in this specification without departing from the spirit and scope of this invention. Accordingly, only such limitations should be imposed on this invention as are indicated in the appended claims.

We claim:
1. The method of making a sausage product having an improved coarse surface particle appearance from a ground sausage batter having coarse and fine particles, said method comprising extruding said ground sausage batter through a tubular extrusion nozzle into a product defining mold, discharging a portion of the coarse particles of said ground sausage batter through a plurality of radially disposed spaced apart open ended slots formed in said tubular extrusion nozzle and located adjacent the discharge end thereof, said spaced apart open ended slots each being sized to enable the passage of said coarse particles of ground sausage batter therethrough, whereby said coarse particles of ground sausage battter which are discharged through said spaced apart openings migrate to a location adjacent the inner surface of said product defining mold.

2. The method of claim 1 wherein said product defining mold is a tubular casing.

3. The method of claim 1 wherein said spaced apart openings in said annular extrusion nozzle have a width of at least 0.25 radian.

4. The method of claim 3 wherein the distance between said spaced apart openings in said annular extrusion nozzle is at least 0.25 radian.

5. The method of claim 1 wherein said spaced apart openings in said annular extrusion nozzle have a circumferential width of from 0.25 to 1.0 radian.

6. The method of claim 5 wherein the circumferential distance between said spaced apart openings in said annular extrusion nozzle ranges from 0.25 to 1.0 radian.

7. The method of making a sausage product having an improved coarse surface particle definition from a ground sausage batter having coarse and fine particles, said method comprising extruding said ground sausage batter through a tubular extrusion nozzle into a product defining mold, confining fine particle portions of said ground sausage batter in said extrusion nozzle by means of a plurality of spaced apart nozzle extensions between which coarse particle portions of said sausage batter are radially discharged into said product defining mold in such manner so as to effect a distribution of the coarse particles of said ground sausage batter adjacent the surface of said finished sausage product.

8. The method of claim 7 wherein the distance between any two adjacent spaced apart nozzle extensions is at least 0.25 radian.

9. The method of claim 8 wherein said spaced apart nozzle extensions have a width of at least 0.25 radian.

10. The method of claim 7 wherein the distance between any two adjacent spaced apart nozzle extensions is at least 0.5 radian.

11. The method of claim 10 wherein said spaced apart nozzle extensions have a width of at least 0.5 radian.

12. A stuffing horn adapted for extrusion of a ground sausage batter having coarse and fine particles into a product defining mold in a manner which provides an improved coarse surface particle appearance on sausage products formed therewith, said stuffing horn comprising a tubular extrusion nozzle having a discharge end through which said ground sausage batter is extruded into the product defining mold, said extrusion nozzle having a plurality of open ended slots formed therein and located adjacent said discharge end, each of said slots being sized to enable the passage therethrough of the coarse particles of said ground sausage batter, whereby said coarse particles of ground sausage batter upon being discharged through said nozzle will pass through said slots adjacent said nozzle tip and migrate to the surface of said product defining mold.

13. The stuffing horn of claim 12 wherein said openings adjacent said nozzle end are defined by a plurality of spaced apart axially aligned nozzle extensions, each of which has a width of at least 0.25 radian and said openings each having a width of at least 0.25 radian.

14. The stuffing horn of claim 13 wherein said openings defined by said axially aligned nozzle extensions each having a width of at least 0.5 radian.

15. The stuffing horn of claim 13 wherein said extrusion nozzle end is equipped with four axially aligned nozzle extensions, equi-distantly spaced around the circumference of said extrusion nozzle, said nozzle extensions defining four slot-like openings adjacent the discharge end of said extrusion nozzle, each of said slot-like openings having a width of at least 0.5 radian.

16. The stuffing horn of claim 15 wherein the ends of said axially aligned nozzle extensions are inwardly inclined to facilitate the insertion of a tubular casing thereover.

References Cited

UNITED STATES PATENTS

| 1,395,967 | 11/1921 | Merli et al. | 17—35 |
| 2,325,446 | 7/1943 | Walter | 17—41 |
| 3,203,807 | 8/1965 | Sloan et al. | 17—41 X |

FOREIGN PATENTS

| 913,033 | 6/1954 | Germany. |
| 8,041 | 2/1959 | Japan. |

LUCIE H. LAUDENSLAGER, *Primary Examiner.*